United States Patent [19]

Acharya et al.

[11] Patent Number: 5,056,006
[45] Date of Patent: Oct. 8, 1991

[54] PARALLEL PROCESSOR WITH SINGLE PROGRAM STORAGE AND SEQUENCER AND SIMULTANEOUS INSTRUCTION PROCESSING

[75] Inventors: Kishore C. Acharya, Brookfield; Paul C. Schanen, Waukesha, both of Wis.

[73] Assignee: General Electric Company, Milwaukee, Wis.

[21] Appl. No.: 551,682

[22] Filed: Jul. 9, 1990

Related U.S. Application Data

[63] Continuation of Ser. No. 243,378, Aug. 12, 1988, abandoned.

[51] Int. Cl.$^5$ .................... G06F 13/00; G06F 15/16
[52] U.S. Cl. ............................ 364/200; 364/228.1; 364/228.6; 364/262.4
[58] Field of Search ... 371/36; 364/749, 200 MS File, 364/900 MS File

[56] References Cited

U.S. PATENT DOCUMENTS

| | | | |
|---|---|---|---|
| 4,507,748 | 3/1985 | Cotton | 364/749 |
| 4,769,771 | 9/1988 | Lippmann et al. | 364/200 |
| 4,821,187 | 4/1989 | Ueda et al. | 364/200 |

OTHER PUBLICATIONS

"Accel Family Overview", Weitek Corp., Oct. 1986, p. 1–25.
WTL 3132/WTL 3332 Floating Point Data Path, Preliminary Data, Jul. 1986, Weitek Corporation.
WTL 7136 32-Bit CMOS Sequencer, Advance Data, Sep. 1986, Weitek Corporation.
WTL 7137 32-Bit Integer Processor, Preliminary Data, Sep. 1986, Weitek Corporation.

*Primary Examiner*—Lawrence E. Anderson
*Attorney, Agent, or Firm*—Quarles & Brady

[57] ABSTRACT

A processor for use in CAT X-ray systems and NMR systems performs floating point arithmetic operations in parallel to shorten processing time. A single program memory and program sequencing unit operates a set of floating point arithmetic units to carry out parallel operations on data set storeed in respective data memories. An integer processor unit executes logical operations and a shared data memory stores constants and other data which is required by the integer processor unit and which is common to the operations performed by all of the floating point arithmetic units.

4 Claims, 4 Drawing Sheets

PARALLEL PROCESSOR WITH SINGLE PROGRAM STORAGE AND SEQUENCER AND SIMULTANEOUS INSTRUCTION PROCESSING

CROSS REFERENCE

This application is a continuation of U.S. Pat. application No. 07/243,378, filed Aug. 12, 1988, now abandoned.

BACKGROUND OF THE INVENTION

The field of the invention is digital processor architecture and, particularly, architectures for processing data in parallel operations.

Digital processors may take a variety of forms which depend on the nature of the processing functions that are to be performed. As shown in FIG. 1a, for example, the most common architecture is a microprocessor 100 which is coupled to a memory 101 by a data bus 102 and an address bus 103. The buses 102 and 103 are typically from 4 bits to 32 bits wide and the memory 101 stores both the control program that directs the microprocessor 100 to perform its functions on data which is also stored in the memory 101. The control program is comprised of a set of instructions which the microprocessor 100 is designed to recognize and execute. This architecture is convenient to use because of the well defined instruction set, but it is slow because the same memory 101 must be accessed sequentially for both control program instructions and data.

Where higher performance is required, a so-called bit-slice architecture is often employed. As shown in FIG. 1b, the bitslice processor 104 executes instructions which it receives from a program memory 105 through a microcode bus 106. In response to the microcode instructions, the bit-slice processor 104 operates on data in a data memory 126. The bit-slice processor 104 operates a microcode address bus 107 to sequence through the control program, and it operates an address bus 108 and a data bus 109 to read and write data to the data memory 126. Because the control program is stored separately, the microcode instructions can be prefetched and retained in an internal register within the bit-slice processor 104 while the bit-slice processor 104 is still carrying out the execution of the previous microcode instruction. The fetching of control program instructions is carried out in parallel with the execution of previous instructions, thus reducing the time required to access external memories. While bit-slice processors are fast and extremely flexible, they are more difficult to work with because the designer must, in essence, define the microcode instruction set and provide all of the design and maintenance tools to program and maintain the microcode.

To overcome the complexities associated with developing microcode, chip sets have been developed which take advantage of the speed of bit-slice processor architecture, but trade off flexibility for a standard instruction set which is easier to use. Such an architecture is shown in FIG. 1c, where the program memory 110 stores control program instructions comprised of a well defined instruction set that is recognized by three separate units: a program sequencing unit (PSU) 111; an integer processor unit (IPU) 112; and a floating point unit (FPU) 113. The PSU 111 functions to address the proper program instruction through a code address bus 114 and to handle branching, calls to subroutines and interrupts, and the return from subroutines and interrupts. The IPU 112 executes certain of the instructions appearing on the code bus 115, including logical operations, Boolean operations and integer arithmetic operations. The FPU 113 responds to instructions calling for floating point arithmetic operations and it is considered an optional device which need not be used in all applications. The IPU 112 and the FPU 113 operate on data stored in a data memory 116 through a data bus 117 and an address bus 118. The parallel fetching of control program instructions is thus achieved, but a standardized instruction set is employed to develop the control program stored in the program memory 110.

The power, or capability, of any of these architectures can be increased in a number of ways. First, the clock speed, can be increased so that the control program is executed more quickly. Secondly, the number of bits in the data bus and processor may be increased so that higher precision operations can be performed in a single instruction execution time. And finally, the functions to be performed may be divided and allocated to separate processing units which operate in parallel with each other. Such parallel processors may employ one or more types of the above processors which are interconnected through shared memories, data links and the like, and which are coordinated by a master, or host, processor to carry out all of the functions to be performed. While such architectures substantially reduce processing time by performing functions simultaneously, or in parallel, the cost of replicating the processor units can be too high for many applications.

There are applications where identical operations are performed on each set of a plurality of sets of data, and significant reductions in processing time can be achieved by assigning processor units to operate on each separate data set. This is particularly true in systems for processing medical images such as those produced by computed axial tomography (CAT) X-ray systems and nuclear magnetic resonance (NMR) systems. Medical imaging systems characteristically acquire many sets of data representing different "views" of the patient. Each view is an array of intensity data which is processed in identical fashion to reconstruct an image. The processing of the data acquired for each view is identical and is very intensive. While such data can easily be processed more quickly by a set of processors, each operating simultaneously and in parallel on data from a view or slice, the cost of replicating processors in large number is prohibitive.

SUMMARY OF THE INVENTION

The present invention relates to a digital processor for operating on a plurality of sets of data simultaneously such that the time required to process the sets of data is substantially reduced. More specifically, the present invention includes a program memory for storing a control program which directs the operations to be performed on each set of data; a program sequencing unit for reading the control program from the program memory; a set of data memories for storing the respective sets of data; and a corresponding set of processors units, each coupled to receive the control program read from the program memory and in response thereto perform operations on the data in their respective data memories.

A general object of the invention is to process a plurality of sets of data in parallel without replicating a corresponding number of control processors and program memories. The program memory and the program sequencing unit along with their associated bus structures are shared by a plurality of processor units and associated data memories. Consequently, by sharing these structures the benefits of parallel processing are achieved while the cost, size and complexity of the system is minimized.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DETAILED DESCRIPTION OF THE INVENTION

Figure 2:
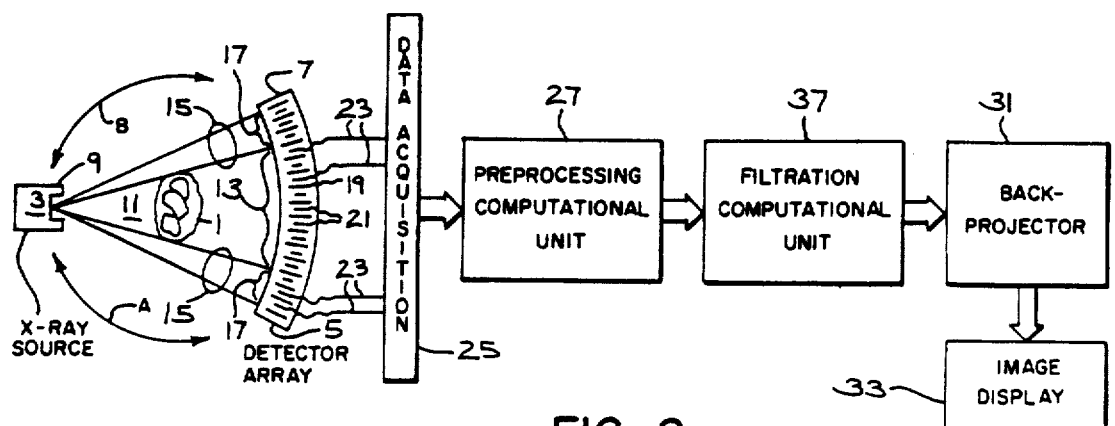
FIG. 2 is a block diagram of a computerized tomography system which incorporates the processor of the present invention.

Referring first to FIG. 2, there is shown schematically a transmission-computed tomography apparatus utilizing a fan-beam scan geometry. A body 1 undergoing examination is interposed between an X-ray source 3 and an array of X-ray detectors, generally designated 5, supported in a detector housing 7. In a typical system, the detector housing may, for example, be filled with an ionizable gas, such as xenon, at a high pressure to increase the X-ray stopping power thereof. X-ray source 3 typically includes a collimation means 9 which functions to confine the X-ray energy emanating from the source to a substantially planar, fan-shaped beam 11. A central sector of X-ray beam 11 irradiates body 1 and is transmitted therethrough to a group 13 of ionization cells in the center of array 5. The angle of the X-ray fan beam is larger than the angle subtended by body 1 so that two peripheral sectors 15 of beam 11 are transmitted past the body without substantial attenuation to two groups of reference cells 17 at the periphery of the array. In a typical array, central group of cells 13 may, for example, comprise 730 or more separate ionization detector cells, while each of the peripheral, reference detector cell groups 17 may comprise a group of approximately 6 cells. All of the central cells 13 are active for studies of body regions, such as the abdomen and thorax. In head studies, the number is often reduced to 512 active cells located centrally in group 13.

Figure 1A:
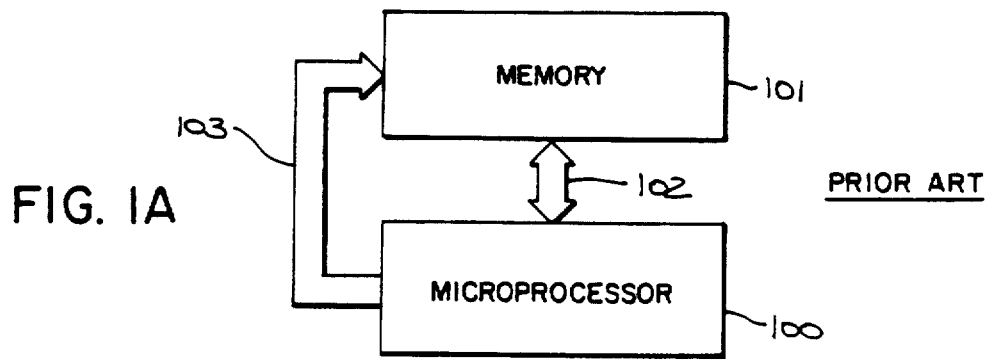
FIGS. 1a, 1b, and 1c are block diagrams of prior art processor architectures.
Figure 1B:
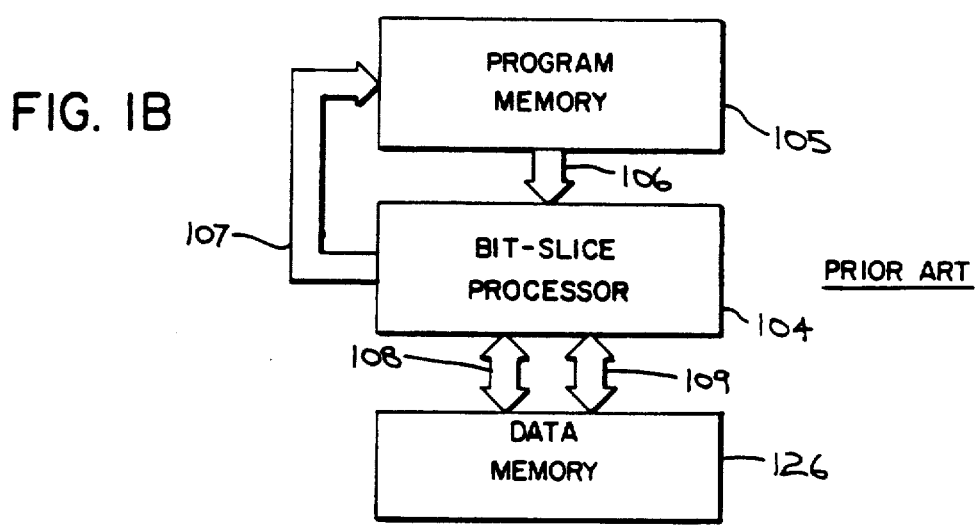

Each cell in the array is made up of a pair of posiively charged anode plates 19 and a negatively charged cathode plate 21 interposed therebetween forming an ionization chamber. In operation, X-ray photons entering the ionization chamber interact with the xenon gas and ionize it to produce electron/ion pairs. The positively charged ions are collected at signal electrodes 21 and induce a signal current therein indicative of the X-ray intensity, while the electrons are collected at anodes 19. The electrical signal current obtained at each signal electrode 21 is produced predominantly by X-ray energy entering a single detector cell. In order to obtain X-ray attenuation data from many different angles (needed to reconstruct a CT cross-sectional image), the X-ray source and the detector array are caused, in one embodiment of scan geometries, to rotate jointly either clockwise or counterclockwise about the body, as suggested by arrows A and B in FIG. 1. In a typical CT scan, the X-ray source and the detector array are mounted in a gantry (not shown) and rotated jointly through a predetermined angle so as to obtain the needed projection data. U.S. Pat. Nos. 4,112,303 and 4,115,695 (both assigned to the same assignee as the present invention) disclose details of gantry construction. A preferred embodiment of the detector array is disclosed in U.S. Pat. No. 4,272,680, also assigned to the same assignee as the present invention.

In the course of a scan, the output of each active detector cell is sampled by a data acquisition system 25, in one particular embodiment, 984 times, resulting in an equal number of projections or views. The sampling rate is cited only by way of example and may be larger or smaller, limited only by the Nyquist sampling criteria. The measurement in each projection obtained from a single detector cell represents, after preprocessing, a ray sum or line integral projection data corresponding to X-ray attenuation along a ray path through the object studied.

Referring still to FIG. 2, the raw projection data from the data acquisition system 25 is applied to a preprocessing computational unit 27. The raw data is organized as a series of arrays and each array is processed in the same manner to compensate for "dark currents" produced in the detectors even when no X-rays are present, to compensate for unequal sensitivities in the detectors and gains in their associated electronics, and to normalize the data to account for variations in X-ray beam intensity throughout the scan. These steps are followed by logarithmic corrections and beam hardening corrections before the data passes to a filtration computational unit 27. As described in U.S. Pat. No. 4,606,004, the filtering operation requires convolving the preprocessed projection data arrays with a kernel function array. Typically, this convolution operation is implemented by taking the discrete Fourier transform of the preprocessed projection data arrays, multiplying them by the discrete Fourier transform of the kernel function, and, finally, taking the inverse discrete Fourier transform of the product. The resulting filtered projection data arrays are then applied to a backprojector 31 which produces an array of intensity data which may be applied to an image display 33 such as a cathode ray tube.

The above calculations are carried out in floating point arithmetic. These are complex and time consuming arithmetic operations, and although there are many steps in the processing sequence, these same steps are performed on each of the data arrays produced by the data acquisition system 25. Considerable processing time can, therefore, be saved by performing these processing steps on each data array at the same time using parallel processors to carry out the preprocessing, filtration and backprojection functions.

Figure 3:
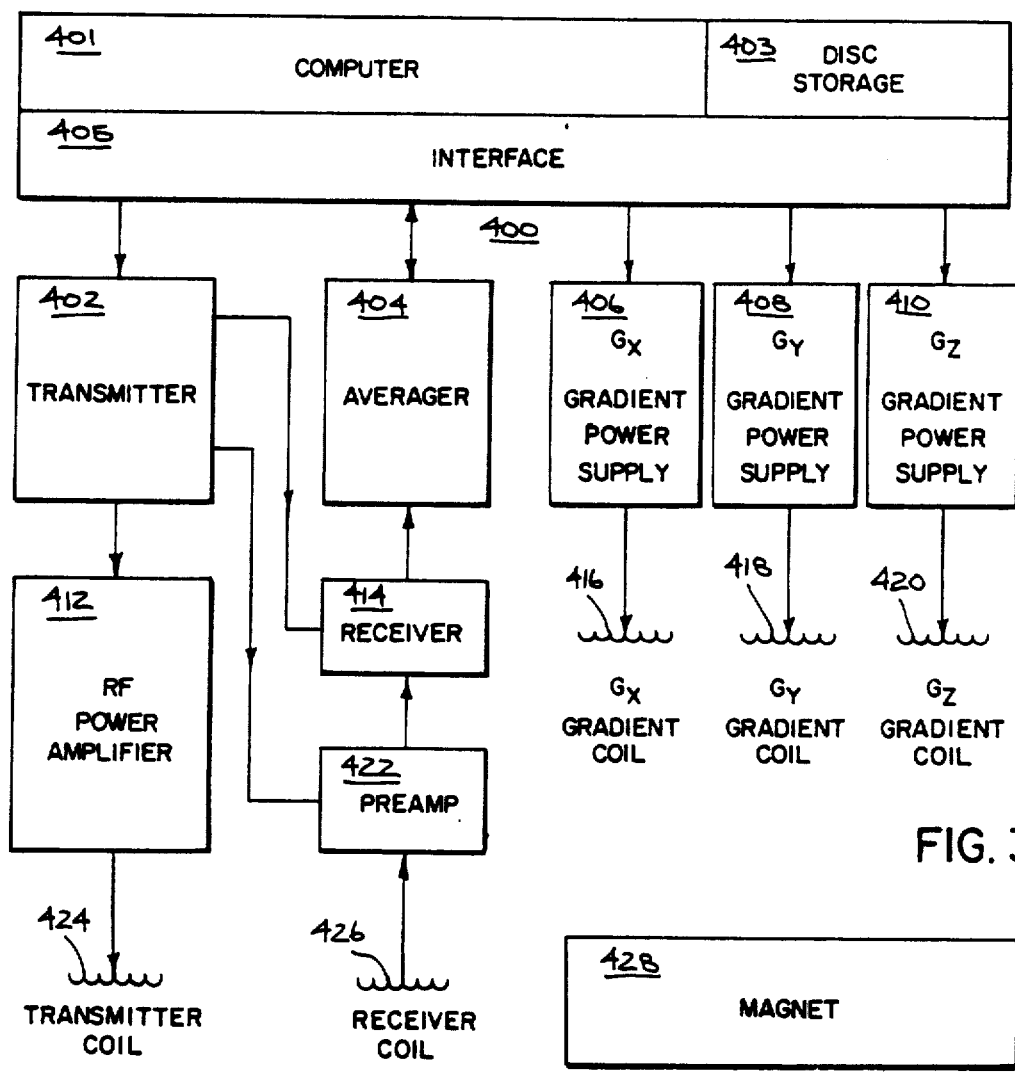
FIG. 3 is a block diagram of an NMR system which incorporates the processor of the present invention.

Referring particularly to FIG. 3, similar data processing capabilities are required to produce images from data acquired by a nuclear magnetic resonance (NMR) scanner system. The NMR system, generally designated 400, is made up of a computer 401 which is functionally coupled to disk storage unit 403 and an interface unit 405. An RF transmitter 402, signal averager 404, and gradient power supplies 406, 408 and 410 for energizing, respectively, $G_x$, $G_y$, $G_z$ gradient coils 416, 418 and 420, are coupled to computer 401 through the interface unit 405.

RF transmitter 402 contains an RF oscillator oscillating at the desired Larmor frequency. The RF transmitter is gated with pulse envelopes from computer 401 to generate RF pulses having the required modulation to excite resonance in the object under study. The RF pulses are amplified in Rf power amplifier 412 to levels varying from 100 watts to several kilowatts, depending on the NMR method, and applied to transmitter coil 424.

The NMR signal produced in response to the applied magnetic fields is sensed by receiver coil 426, amplified in a low noise preamplifier 422, and applied for further amplification, detection, and filtering to receiver 414. The signal is then digitized for averaging by signal averager 404 and for processing by computer 401.

Computer 401 provides gating and envelope modulation for the RF excitation pulses, blanking for the preamplifier and RF power amplifier, voltage waveforms for the gradient power supplies and it advances the gradients during the series of pulse sequences which comprise a scan. During a typical scan, a set of signals $S(t)$ are acquired and digitized to form a corresponding set of data arrays. The computer performs processing functions on these data arrays such as Fourier transforms, data filtering, and storage functions. As with the X-ray CT system of FIG. 2, the NMR data undergoes a series of complex and lengthy processing steps, however, these can be carried out simultaneously by a set of parallel processors which each operate on respective ones of the NMR data arrays.

The present invention is a processor which is particularly well suited for carrying out substantially similar processing steps in parallel on a plurality of different data sets. It is, therefore, particularly applicable for carrying out processing steps in systems such as the above-described X-ray CT system and NMR scanner system.

Figure 4:
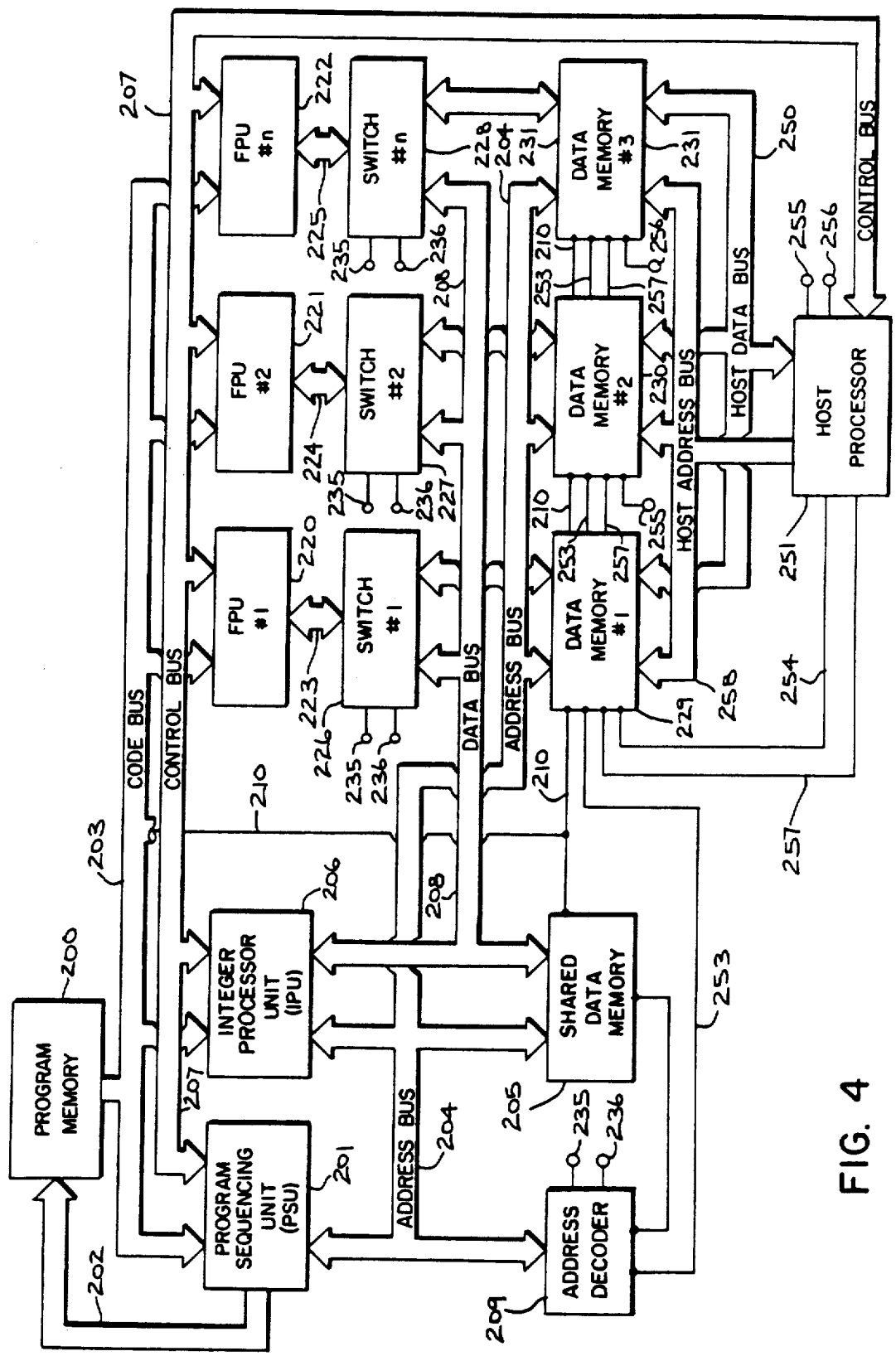
FIG. 4 is an electrical schematic diagram of a first preferred embodiment of the processor of the present invention.

Referring particularly to FIG. 4, the preferred embodiment of the processor includes a program memory 200 which stores the instructions that carry out the processing steps. The program memory 200 may be any size and it may employ read-only memory (ROM) devices, programmable read-only memory (PROM) devices, or read/write random access memory (RAM) devices. The program memory 200 is addressed by a program sequencing unit 201 through a 32 bit code address bus 202 and the addressed program instructions are read out onto a 128 bit code data bus 203. The program sequencing unit 201 is a commercially available device such as the WTL 7136 32 bit CMOS sequencer manufactured by Weitek Corporation of Sunnyvale, Calif., which sequentially addresses the instructions in the program memory 200, and which responds to the operation codes in such instruction to carry out branch, conditional branch, subroutine call and return, software interrupt and interrupt return, loop control and co-processor control operations. The program sequencing unit 201 also connects to a 32 bit address bus 204 which enables it to transfer data between its internal registers and the rest of the system and to save and restore its stack registers in a shared data memory 205 through an integer processor unit 206. A control bus 207 also connects to the program sequencing unit 201 and it includes lines which enable the unit 201 to respond to external NOPs or wait states which stop or delay program execution and to stall or abort commands which cancel instructions in the event of delayed program instructions or delayed data. In addition, the code bus 203 includes five lines which indicate whether the current program instruction is a load, store or interrupt return/acknowledge, and it includes lines which carry an operation code produced by the unit 201 for controlling external registers.

The integer processor unit 206 receives the instructions read from the program memory 200, and in response to the operation codes therein, it carries out specific functions in its executable instruction set. These functions include integer arithmetic functions such as 32 bit addition, subtraction, multiply and divide, as well as logical functions and shifting operations. The unit 206 is commercially available as the WTL 7137 32 bit Integer Processor manufactured by Weitek Corporation. The integer processor unit 206 performs load and store functions in which it applies an address code to the address bus 204 and either reads from or writes to a 32 bit data bus 208.

The address code on the bus 204 is applied to a decoder circuit 209 which enables various elements of the system, including the shared data memory 205. The direction in which data moves is determined by a read/write control line 210 in the code bus 203.

Figure 1C:
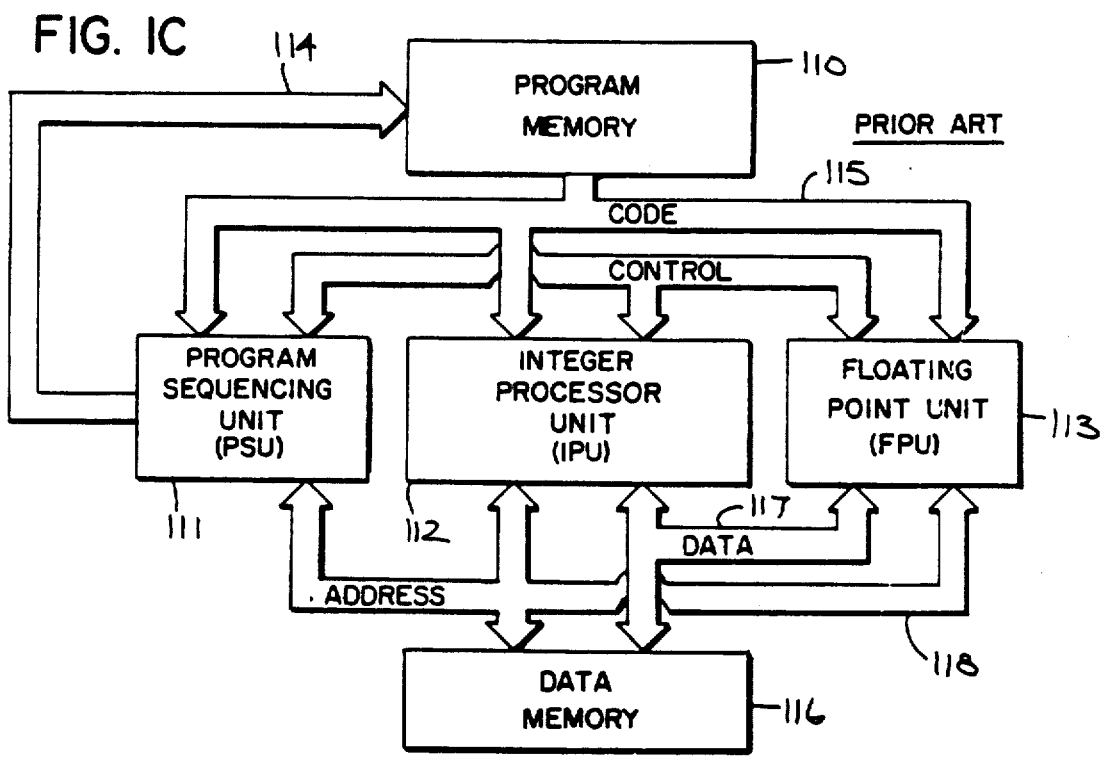

The system thus far described is a very conventional data processor system which is capable of carrying out nearly any data processing function. When floating point math is to be performed, it is standard practice to also add a floating point unit which operates in parallel with the integer processor unit 206 and is connected as shown in FIG. 1c.

In contrast, the processor of the present invention includes a set of floating point units which operate in parallel to carry out functions indicated by the instructions stored in the program memory 200. In the embodiment shown in FIG. 4, three such floating point units 220, 221 and 222 are employed, but it will be apparent from the following description that any number of such floating point units can be used to provide the optimal amount of a parallel processing for each particular application. Each floating point unit 220-222 is commercially available as the WTL 3132 Floating Point Data Path manufactured by Weitek Corporation.

Floating point units 220-222 are each connected to the control bus 207 and each receives the instructions read from the program memory 200 through the code bus 203. When an operation code appears in program instructions that are executed by a floating point processor, all three floating point processors 220-222 execute the same instruction in synchronism with each other. The floating point units 220-222 each include a single 32 bit data port 223-225 through which it can read, or load, data with which it performs arithmetic operations and through which it can write, or store, the result of such an arithmetic operation. Bi-directional switches 226-228 connect to the respective data ports 223-225. These switches 226-228 are each constructed from two sets of bi-directional bus transceivers such as the 74LS245 manufactured by Texas Instruments, Inc., and in response to a pair of enable signals 235 and 236 from the address decoder 209, these switches 226-228 couple the ports 223-225 to either the 32 bit data bus 208 or the data terminal on respective data memories 229-231. Thus, in response to instructions read from the program memory 200, all three floating point units 220-222 may be coupled to the data bus 208 and read a value from the shared data memory 205. Such values may be, for example, a constant which is required in an algorithm being executed by all three floating point processors 220-222. On the other hand, the floating point processors 220-222 are responsive to other instructions read from the program memory 200 to read data from or write data to their respective data memories 229-231. As a result, each floating point unit 220-222 may operate on separate sets of data stored in the respective data memories 229-231 to produce separate results which are also stored in the respective data memories 229-231. However, they may also employ common data, which is stored in the shared data memory 205.

It should be apparent from the above description that instructions stored in the program memory 200 may be execute to perform parallel data processing functions on separate sets of data stored in the respective data memories 229-231. For example, each data memory 229-231 may store a separate array of data that has been acquired from an X-ray CT scanner or an NMR scan, and upon which a convolution operation is to be performed. The stored program may direct each floating point unit 220-222 to perform a discrete Fourier transform on its respective data array and store the result back in the same respective data memories 229-231. The same program may then direct the integer processor unit 206 to create a kernel array in Fourier space and store it in the shared data memory 205, and then direct each floating point unit 220-222 to perform a matrix multiply using the common kernel array and the respective transformed arrays in memories 229-231. The separate results are stored in respective memories 229-231 and the floating point units 220-222 are directed to perform a discrete inverse Fourier transform thereon to produce the convolution of each of the original data arrays. With the invented structure, therefore, three separate data arrays are convolved in the time it would normally require to convolve a single data array.

The number of floating point units and associated data memories used will depend on the particular application and on the balance between decreased processing time and increased cost. For example, in an NMR scanner in which data TM for ten slices is obtained during a single scan, it would be feasible to provide ten floating point processors so that the data for all ten slices can be processed simultaneously. On the other hand, costs may dictate that only five floating point units be used and that the data be processed in two batches of five slices per batch. It should be apparent that one of the major advantages of the present invention is that a high degree of parallel processing can be achieved without the usual corresponding increase in hardware and cost. This is accomplished by sharing a single program memory, program sequencing unit, integer processor unit, and shared data memory. Only the floating point unit and associated data memory need be duplicated to increase the degree of parallel processing.

The manner in which the processor interfaces with the rest of the system in which it resides may vary considerably. In the preferred embodiment of FIG. 4, the interface is achieved primarily by providing a separate data port into each of the data memories 229-231. These second data ports are connected to a 32 bit host data bus 250 which connects to a general purpose host computer 251 that is responsible for the overall operation of the system. Control of the data memories 229-231 is shared with the host computer 251 which may gain access to load input data into each of the memories 229-231 and to read output data therefrom at the conclusion of the parallel processing operations. The memories 229-231 are dual-port RAMs such as the IDT7132S/L manufactured by Integrated Device Technology, Inc. which contain their own, built-in arbitration circuits. Control of the memories 229-231 is determined by these arbitration circuits which receive memory requests from the address decoder 209 through control lines 254-256. The arbitration circuits grant access on a first-come first-serve basis, and they lock out the other processor until the entire memory read or write operation is completed. The arbitration circuit grants access to the parallel processor by coupling its read/write control line 210 and its address bus 204 to the data memories 229-231. On the other hand, it grants access to the host computer 251 by coupling its read/write control line 257 and its address bus 258 to the data memories 229-231. In response to the applied address code, the same location in each data memory 229-231 is accessed and the state of the applicable W/R control line determines whether a read or write cycle is being performed. The host computer 251 also connects to the control bus 207 so that it can determine when the parallel processor is finished with the data residing in the memories 229-231 and so that it can signal the parallel processor to begin processing new data.

There are many variations which can be made to the processor architecture of the preferred embodiment without departing from the present invention. Some of these variations are illustrated in FIG. 5 which discloses a second preferred embodiment of the invention.

Figure 5:
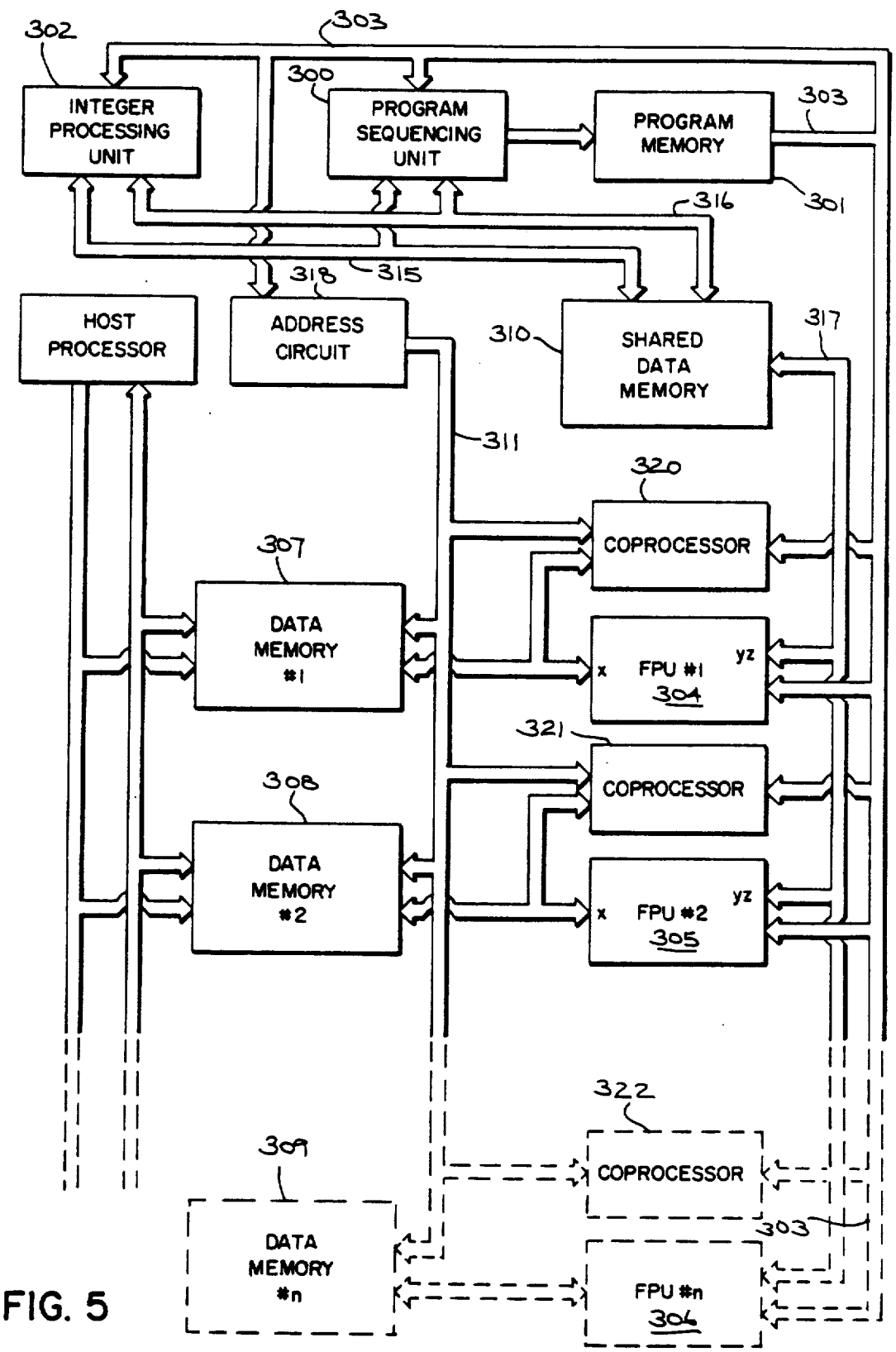
FIG. 5 is an electrical schematic diagram of a second preferred embodiment of the processor of the present invention.

Referring particularly to FIG. 5, a program sequencing unit 300, program memory 301 and integer processor unit 302 are connected as before and operate as described above with reference to FIG. 4. In addition, a code bus 303 driven by the microcode read from the program memory 301 connects to a set of n floating point processor units indicated at 304, 305 and 306. However, the floating point processor units 304-306 are different than those described above in that they are WTL 3332 processors produced by the same manufacturer which have two separate 32 bit data ports rather than one. One of these data ports, "x" connects to the data terminals on an associated data memory 307-309, and the other data port "yz" connects to the data terminals on a shared data memory 310. In response to the instructions on the code bus 303, therefore, each floating point processor unit 304-306 may read or write data from either the shared data memory 310 or its own associated data memory 307-309. The separate electronic switches 226-228 shown in FIG. 4 are thus replaced by a more complex FPU 304-306 which incorporates their function as part of the floating point processor unit.

Another variation in the embodiment of FIG. 5 is a separate address bus 315 for the shared data memory 310 and another address bus 311 for the data memories 307-309. The address bus 315 is driven by the integer processing unit 302 as described above to select data storage locations in the shared data memory 310. This data may be coupled through either of its data buses 316 or 317 depending on the instruction on the code bus 303.

The address bus 311 is driven by an address circuit 318 which produces the address in response to instruction in the code bus 303. While the address circuit 318 may be constructed of discrete logic or a custom integrated circuit, in the preferred embodiment an integer processing unit WTL 7137 manufactured by Weitek Corporation is used for this purpose because it is compatible with the other integrated circuits and it will perform the required addressing functions. Of course, it will also perform many other functions, but these are not used.

By separately driving the address buses for the shared data memories 310 and the data memories 307-309, a more flexible architecture is provided. For example, in response to a single instruction on the code bus 303, the integer processing unit 302 may access the shared data memory 310 to perform an operation thereon, and simultaneously, the floating point units 304-306 may access their respective data memories 307-309 to perform an operation thereon. In this manner more operations can be performed simultaneously to further reduce processing time.

Yet another variation illustrated in the embodiment of FIG. 5 is the use of a coprocessor 320-322 with each of the respective floating point units 304-306. The use of a coprocessor to supplement the functional capability of a commercially available processor unit is, of course, common practice. In this application, the coprocessor is formed of discrete logic components which assist their floating point unit in carrying out arithmetic operations commonly found in medical imaging. These functions include $\log x$, $1/x$, $\sqrt{x}$, and $1/\sqrt{x}$, where the input value of x is read from an associated data memory 307-309 and the resulting output value is read from the coprocessor by its associated floating point unit 304-306. The function performed by the coprocessors 320-322 is determined by the bit pattern on the code bus 303 and the contents of the coprocessors are addressed through the address bus 311.

We claim:

1. In a medical imaging system a digital processor for operating in a plurality of sets of acquired image data simultaneously, the combination comprising:
    a program memory for storing a program which directs the operation to be performed on each set of acquired image data;
    a program sequencing unit for reading the control program instructions from the program memory;
    a set of data memories for storing the respective sets of acquired image data;
    a shared data memory for storing data required in the processing of the acquire image data; and
    a set of processor units, each coupled to a respective one of the data memories and to the program memory and the shared data memory, each processor unit being operable to receive the program instructions read from the program memory by the program sequencing unit and in response to selected ones of the program instructions perform simultaneous operations on the acquired image data in the respective data memories, and in response to other selected ones of the program instructions simultaneously operate on data stored in the shared memory.

2. The digital processor all recited in claim 1 which includes a common processing unit that couples to the program memory and the shared data memory and being operable to receive the program instructions read from the program memory by the program sequencing unit, and in response to third selected ones of the program instructions, to perform logical operations that effect the processing of all the sets of acquired image data; and
    wherein each processor unit is responsive to the third selected ones of the program instructions to perform no operation.

3. The digital processor as recited in claim 1 in which each processor unit includes switch means which couples the processor unit to both the shared data memory and the processor unit's own data memory, and in which the switch means is operable in response to control program instructions read from the program memory to convey data between its processor unit and either the shared data memory or the processor unit's own data memory.

4. The digital processor as recited in claim 1 in which each processor unit includes both an FPU means and a coprocessor which collectively execute all of said selected ones of the program instructions and in which the FPU means executes one subset of said selected ones of the program instructions and the coprocessor executes a second subset of said selected ones of the program instructions.

* * * * *